United States Patent
You et al.

(10) Patent No.: US 10,764,759 B2
(45) Date of Patent: Sep. 1, 2020

(54) METHOD FOR TRANSMITTING AND RECEIVING WIRELESS SIGNAL AND DEVICE FOR SAME

(71) Applicant: LG ELECTRONICS INC., Seoul (KR)

(72) Inventors: Hyangsun You, Seoul (KR); Joonkui Ahn, Seoul (KR); Daesung Hwang, Seoul (KR); Yunjung Yi, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 16/324,030

(22) PCT Filed: Aug. 8, 2017

(86) PCT No.: PCT/KR2017/008574
§ 371 (c)(1),
(2) Date: Feb. 7, 2019

(87) PCT Pub. No.: WO2018/030766
PCT Pub. Date: Feb. 15, 2018

(65) Prior Publication Data
US 2019/0174327 A1 Jun. 6, 2019

Related U.S. Application Data

(60) Provisional application No. 62/373,949, filed on Aug. 11, 2016, provisional application No. 62/372,279, filed on Aug. 8, 2016.

(51) Int. Cl.
*H04W 72/04* (2009.01)
*H04L 5/00* (2006.01)
(Continued)

(52) U.S. Cl.
CPC ............... *H04W 16/14* (2013.01); *H04L 1/08* (2013.01); *H04L 1/1812* (2013.01); *H04W 4/70* (2018.02);
(Continued)

(58) Field of Classification Search
CPC ........................ H04W 72/042; H04L 5/0053
See application file for complete search history.

(56) References Cited

U.S. PATENT DOCUMENTS

2014/0105191 A1   4/2014   Yang et al.
2018/0227943 A1*   8/2018   Xiao ..................... H04W 76/23

FOREIGN PATENT DOCUMENTS

KR     1020110073334 A    6/2011

OTHER PUBLICATIONS

NEC, "Schedule Assignment for SPS", 3GPP TSG RAN WG1 Meeting #85, May 23-27, 2016, R1-164473.
(Continued)

*Primary Examiner* — Hoon J Chung
(74) *Attorney, Agent, or Firm* — Dentons US LLP

(57) ABSTRACT

The present invention relates to a wireless communication system and provides a method and a device for same. The method comprises the steps of: receiving information about SPS transmission periods; confirming information about the number of SPS repetitions; and receiving SPS data, which is newly and repeatedly transmitted in every SPS transmission period, on the basis of the SPS transmission periods and the number of the SPS repetitions, wherein, if the SPS transmission periods are greater than the number of the SPS repetitions, a frequency band in which the SPS data is received is maintained to be the same in every SPS transmission period and, if the SPS transmission periods are smaller than the number of the SPS repetitions, the fre-
(Continued)

quency band in which the SPS data is received is switched in every SPS transmission period.

12 Claims, 13 Drawing Sheets

(51) Int. Cl.
*H04W 16/14* (2009.01)
*H04L 1/08* (2006.01)
*H04W 4/70* (2018.01)
*H04W 76/11* (2018.01)
*H04W 76/27* (2018.01)
*H04L 1/18* (2006.01)
*H04W 88/02* (2009.01)

(52) U.S. Cl.
CPC ..... *H04W 72/042* (2013.01); *H04W 72/0446* (2013.01); *H04W 76/11* (2018.02); *H04W 76/27* (2018.02); *H04W 88/02* (2013.01); *H04L 1/1896* (2013.01); *H04L 5/0007* (2013.01)

(56) References Cited

OTHER PUBLICATIONS

NTT DoCoMo, Inc., "(E)PDCCH for sidelink SPS configuration switching", 3GPP TSG RAN WG1 Meeting #85, May 23-27, 2016, R1-165193.
Panasonic, "Sensing and SPS for UE Autonomous Mode", 3GPP TSG RAN WG1 Meeting #85, May 23-27, 2016, R1-165315.

* cited by examiner

METHOD FOR TRANSMITTING AND RECEIVING WIRELESS SIGNAL AND DEVICE FOR SAME

This application is a National Stage Application of International Application No. PCT/KR2017/008574, filed on Aug. 8, 2017, which claims the benefit of U.S. Provisional Application No. 62/372,279 filed on 8 Aug. 2016, and U.S. Provisional Application No. 62/373,949 filed on 11 Aug. 2016, all of which are hereby incorporated by reference in their entirety for all purposes as if fully set forth herein.

TECHNICAL FIELD

The present invention relates to a wireless communication system, and more particularly, to a method and apparatus for transmitting/receiving a wireless signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

In one aspect of the present invention, provided herein is a method for receiving data by a user equipment in a wireless communication system, the method including receiving information about a semi-persistent scheduling (SPS) transmission period, checking information about the number of SPS repetitions, and receiving new SPS data repeatedly transmitted in every SPS transmission period based on the SPS transmission period and the number of SPS repetitions, wherein, when the SPS transmission period is longer than the number of SPS repetitions, a frequency band in which the SPS data is received is maintained to be the same in every SPS transmission period, and wherein, when the SPS transmission period is shorter than the number of SPS repetitions, the frequency band in which the SPS data is received is switched in every SPS transmission period.

In another aspect of the present invention, provided herein is a user equipment (UE) used in a wireless communication system, the user equipment including a radio frequency (RF) unit, and a processor configured to control the RF unit, wherein the processor is configured to receive information about a semi-persistent scheduling (SPS) transmission period, check information about the number of SPS repetitions, and receive new SPS data repeatedly transmitted in every SPS transmission period based on the SPS transmission period and the number of SPS repetitions, wherein, when the SPS transmission period is longer than the number of SPS repetitions, a frequency band in which the SPS data is received is maintained to be the same in every SPS transmission period, and wherein, when the SPS transmission period is shorter than the number of SPS repetitions, the frequency band in which the SPS data is received is switched in every SPS transmission period.

When the SPS transmission period is shorter than the number of SPS repetitions, previous SPS data and current SPS data may be simultaneously received in different frequency bands at a time when each SPS transmission period starts.

When the SPS transmission period is shorter than the number of SPS repetitions, a hybrid ARQ (HARQ) process ID for the SPS data may be determined based on the frequency band in which the SPS data is received.

The information about the SPS transmission period may be received through radio resource control (RRC) signaling, and the information about the number of SPS repetitions may be received on a physical downlink control channel (PDCCH) indicating SPS activation.

The SPS data may include machine-type communication (MTC) data and a maximum size of each of the frequency bands may be 6 physical resource blocks (PRBs).

Information indicating an SPS transmission band may be further received, wherein, when the SPS transmission band is wider than 6 PRBs, the SPS transmission band is limited to a multiple of 6 PRBs, and the SPS data is repeatedly received on the 6 PRBs [the SPS transmission band/6 PRBs] times.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
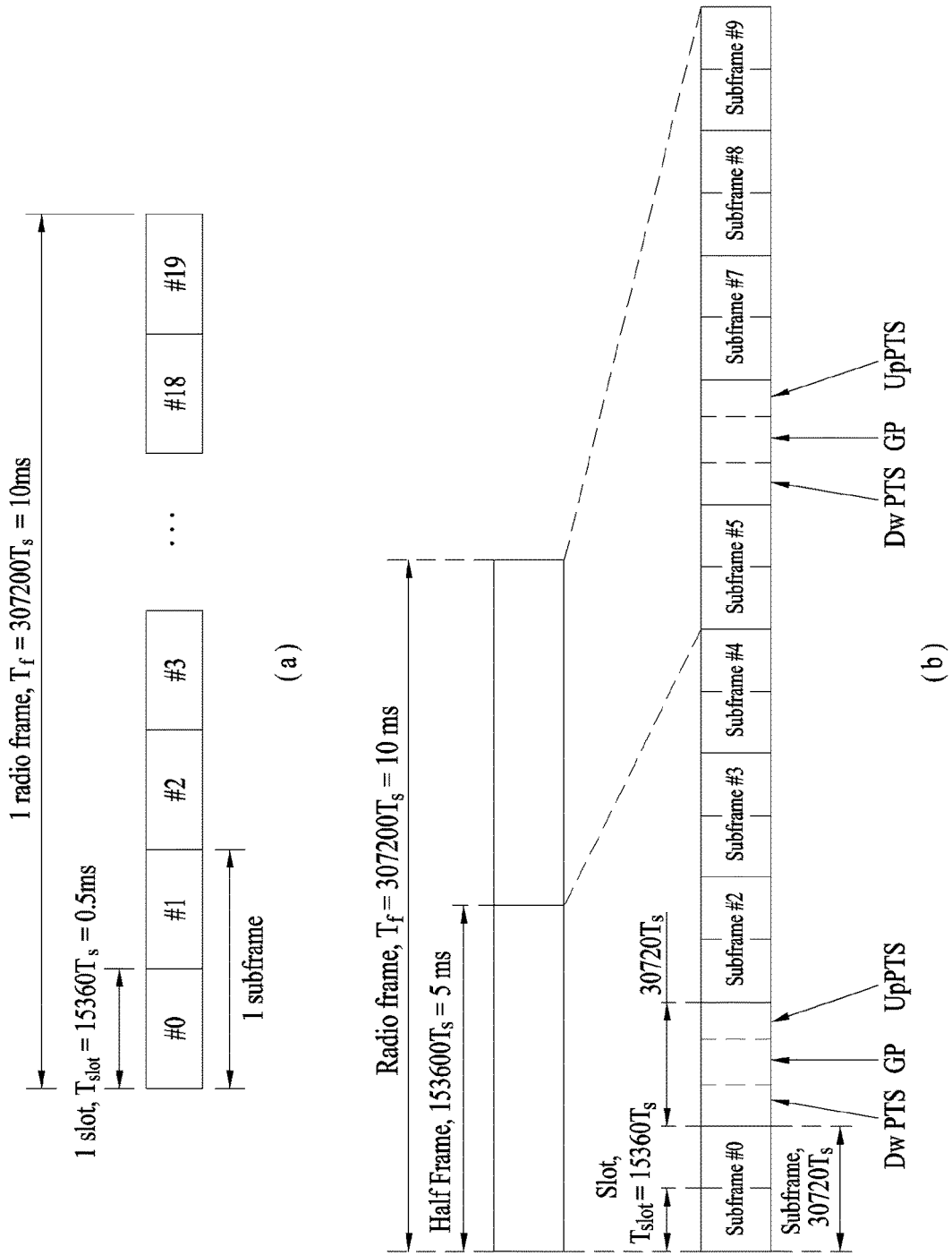
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through a contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
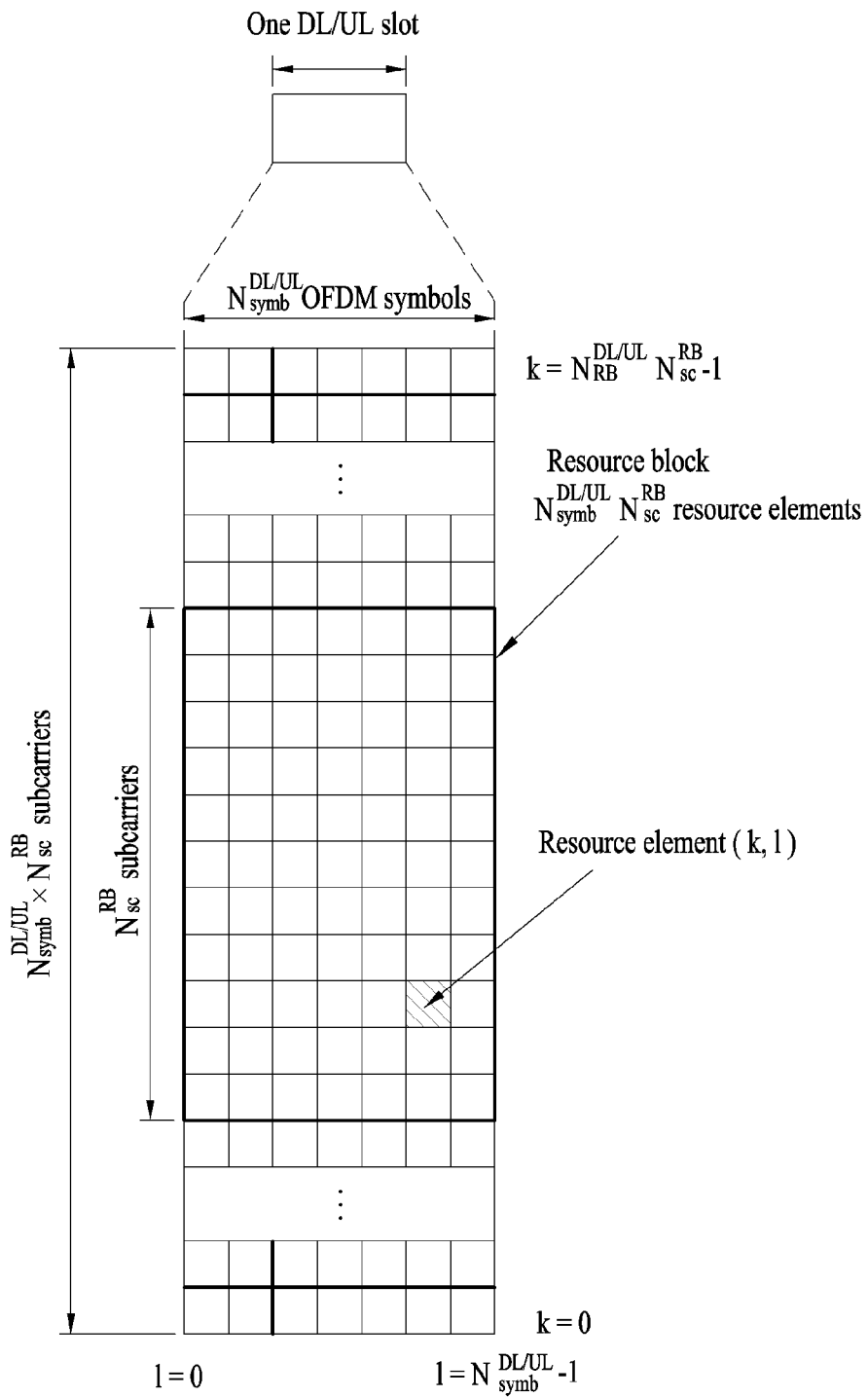
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
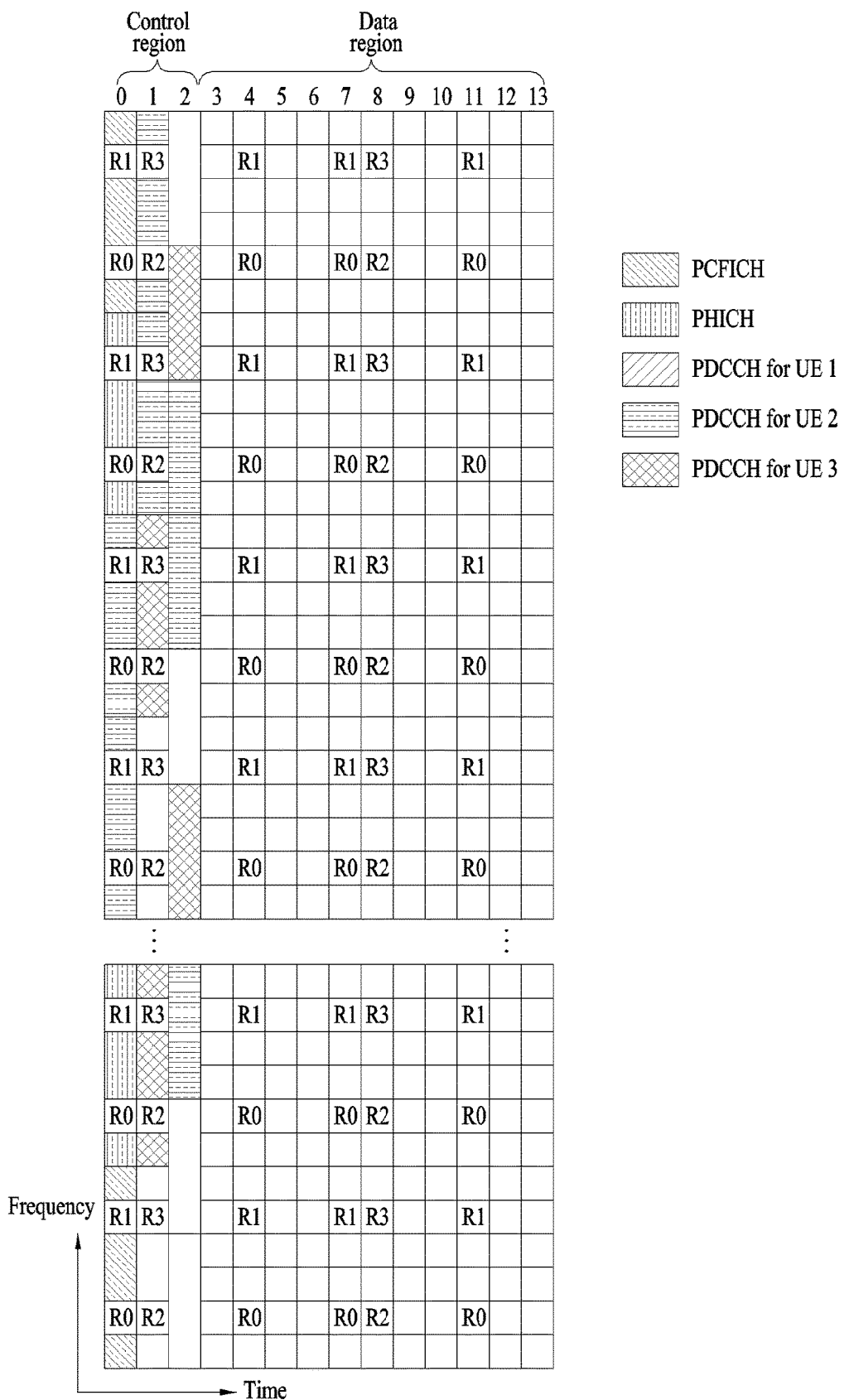
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH Non-MBSFN subframes (except subframe 6 for frame structure type 2) configured with positioning reference signals | 0 | 0 |
| | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |

TABLE 4-continued

| DCI format | Description |
|---|---|
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE. Table 5 shows transmission modes for configuring the MIMO technology and DCI formats used by the UE to perform blind decoding in the corresponding transmission modes. In particular, Table 6 shows a relationship between the PDCCH and PDSCH configured by a cell radio network temporary identifier (cell RNTI or C-RNTI).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |

TABLE 5-continued

| Transmission mode | DCI format | Search Space | Transmission scheme of PDSCH corresponding to PDCCH |
|---|---|---|---|
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe, where m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG A resource element (RE) occupied by the reference signal (RS) is not included in the REG Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following Table shows an example of aggregation levels for defining SS.

TABLE 6

| Type | Search space $S^{(L)}_k$ | | Number of PDCCH candidates $M^{(L)}$ |
|---|---|---|---|
|  | Aggregation level L | Size [in CCEs] |  |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
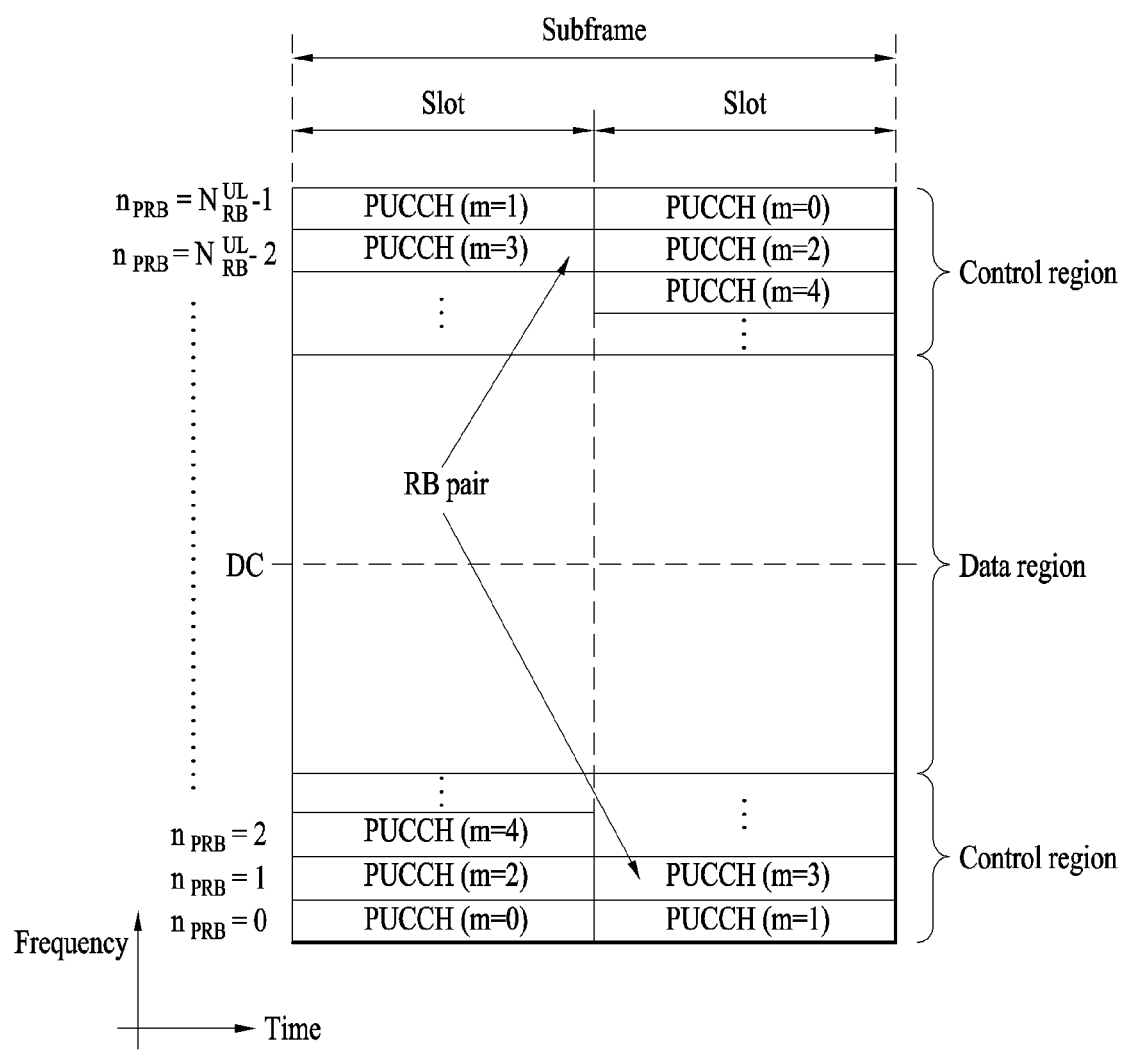
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Various PUCCH formats can be used for UCI transmission. UCI carried by one PUCCH may have different size and usage according to PUCCH formats, and size thereof may vary according to coding rates.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the other hand, since a plurality of serving cells can be configured in a multi-carrier system, transmission of UL/DL grant through a serving cell having a good channel state may be allowed. In this way, when a cell carrying UL/DL grant corresponding to scheduling information is different from that where UL/DL transmission corresponding to the UL/DL grant is performed, it can be referred to as cross-carrier scheduling.

Hereinafter, the case where a cell is scheduled by itself and the case where a cell is scheduled by another cell will be respectively referred to as self-CC scheduling and cross-CC scheduling.

The 3GPP LTE/LTE-A system can support aggregation of a plurality of CCs and cross carrier-scheduling operation based on the aggregation to improve a data transmission rate and achieve stable control signaling.

When the cross-carrier scheduling (or cross-CC scheduling) is applied, a PDCCH carrying a DL grant, that is, downlink allocation for DL CC B or DL CC C may be transmitted through DL CC A, and a corresponding PDSCH may be transmitted through DL CC B or DL CC C. In addition, a carrier indicator field (CIF) may be introduced for the cross-CC scheduling. The CIF can be included or not in the PDCCH, and this can be configured through higher layer signaling (e.g., RRC signaling) semi-statically and UE-specifically (or UE-group-specifically).

Figure 5:
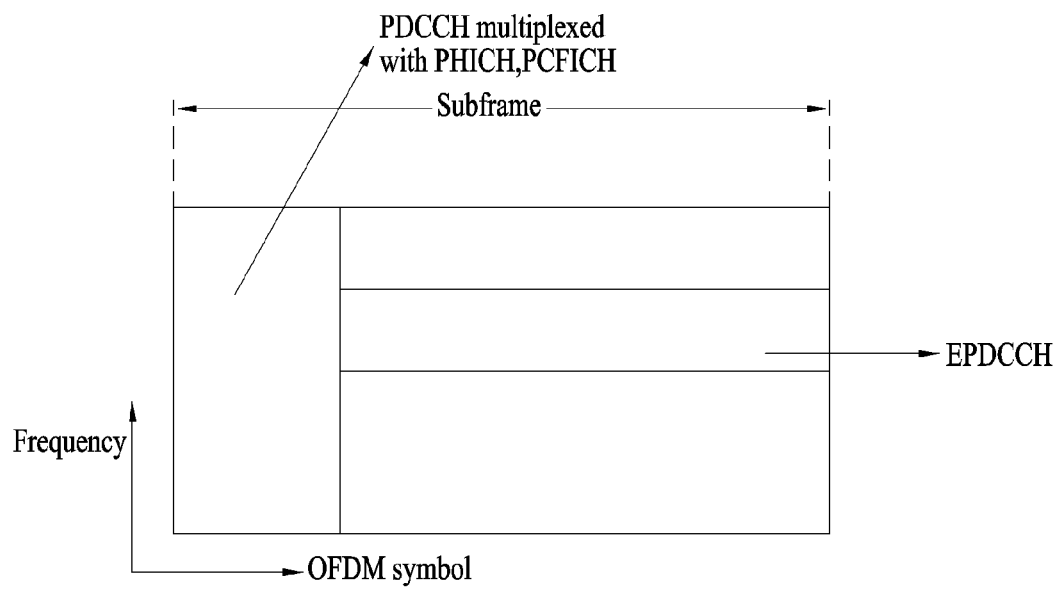
FIG. 5 is an example of a downlink control channel configured in a data region of a DL subframe.

FIG. 5 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level L∈{1,2,4,8,16,32} is defined by a set of EPDCCH candidates. For an EPDCCH-PRB-setp, the ECCEs corresponding to EPDCCH candidate m of the search space $ES^{(L)}_k$ are given by the following equation.

$$L\left\{\left(Y_{p,k}+\left\lfloor\frac{m\cdot N_{ECCE,p,k}}{L\cdot M_p^{(L)}}\right\rfloor+b\right)\mathrm{mod}\lfloor N_{ECCE,p,k}/L\rfloor\right\}+i \quad \text{[Equation 6]}$$

where i=0, . . . , L−1. b=$n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). m=0,1, . . . ,$M^{(L)}_p$−1, $M^{(L)}_p$ is the number of EPDCCH candidates to monitor at aggregation level L in EPDDCH-PRB-set p. The variable $Y_{p,k}$ is defined by $Y'_{p,k}$=$(A_p·Y_{p,k}$−1) mod D', where $Y_{p,k-1}$=$n_{RNTI}$≠0, $A_0$=39827, $A_0$=39829,D=65537 and k=floor($n_s$/2). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 7, the number of EREGs per ECCE is given by Table 8. Table 7 shows an example of supported EPDCCH formats, and Table 8 shows an example of the number of EREGs per ECCE, $N^{EREG}_{ECCE}$. Both localized and distributed transmission is supported.

TABLE 7

| | Number of ECCEs for one EPDCCH, $N^{EPDCCH}_{ECCE}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}$−1. ECCE number n is corresponding to the following EREG(s):

EREGs numbered (n mod $N^{ECCE}_{RB}$)+j$N^{ECCE}_{RB}$ in PRB index floor(n/$N^{ECCE}_{RB}$) for localized mapping, and EREGs numbered floor (n/$N^{Sm}_{RB}$)+j$N^{ECCE}_{RB}$ in PRB indices (n+jmax(1,$N^{Sp}_{RB}/N^{ERGE}_{CCE}$))mod $N^{Sp}_{RB}$ for distributed mapping, where j=0,1, . . . ,$N^{EREG}_{ECCE}$−1, $N^{EREG}_{ECCE}$ is the number of EREGs per ECCE, and $N^{ECCE}_{RB}$=16/$N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 7 applies when:
DCI formats 2, 2A, 2B, 2C or 2D is used and $N^{DL}_{RB} \geq 25$, or
any DCI format when $n_{EPDCCH} < 104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair,
they are assumed by the UE not to be used for CRSs or CSI-RSs,
the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 10 with $n' = n_{ECCE,low}$ mod $N^{ECCE}_{RB} + n_{RNTI}$ mod min($N^{ECCE}_{EPDCCH}$, $N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 9

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Normal subframes, Special subframes, configurations 3, 4, 8 |
| 0 | 107 | 107 | 107 |
| 1 | 108 | 109 | 108 |
| 2 | 109 | — | — |
| 4 | 110 | — | — |

For distributed transmission, each resource element in an EREG is associated with one out of two antenna ports in an alternating manner where p∈{107,109} for normal cyclic prefix and p∈{107,108} for extended cyclic prefix.

Hereinafter, the PDCCH and EPDCCH will be commonly referred to as the PDCCH or (E)PDCCH.

A description will be given of HARQ (hybrid automatic repeat request). When a plurality of UEs having data to be transmitted on uplink/downlink is present in a wireless communication system, a BS select a UE that will transmit data per transmission time interval (TTI) (e.g. subframe). In a system using multiple carriers or similar, the BS selects a UE that will transmit data on uplink/downlink per TTI and also selects a frequency band used for the UE to transmit data.

In the case of uplink transmission, UEs transmit reference signals (or pilot signals) on uplink and the BS checks channel states of the UEs using the reference signals transmitted from the UEs and selects UEs, which will transmit data on uplink in unit frequency bands thereof, per TTI. That is, the BS transmits an uplink assignment message instructing an uplink scheduled UE to transmit data using a specific frequency band in a specific TTI. The uplink assignment message is also referred to as a UL grant. The UE transmits data on uplink in response to the uplink assignment message. The uplink assignment message may include UE ID (UE identity), RB allocation information, MCS (modulation and coding scheme), RV (redundancy version), NDI (new data indicator), etc.

In the case of synchronous non-adaptive HARQ, a retransmission time is systematically appointed (e.g. after 4 subframes from a NACK reception time). Accordingly, the BS can transmit a UL grant message to a UE only during initial transmission and retransmission following the initial transmission is performed according to an ACK/NACK signal (e.g. PHICH signal). In the case of asynchronous adaptive HARQ, a retransmission time is not appointed, and thus the BS needs to transmit a retransmission request message. Furthermore, since a frequency resource or MCS for retransmission varies according to transmission time, the retransmission request message can include a UE ID, RB allocation information, HARQ process index, RV, NDI, etc.

Figure 6:
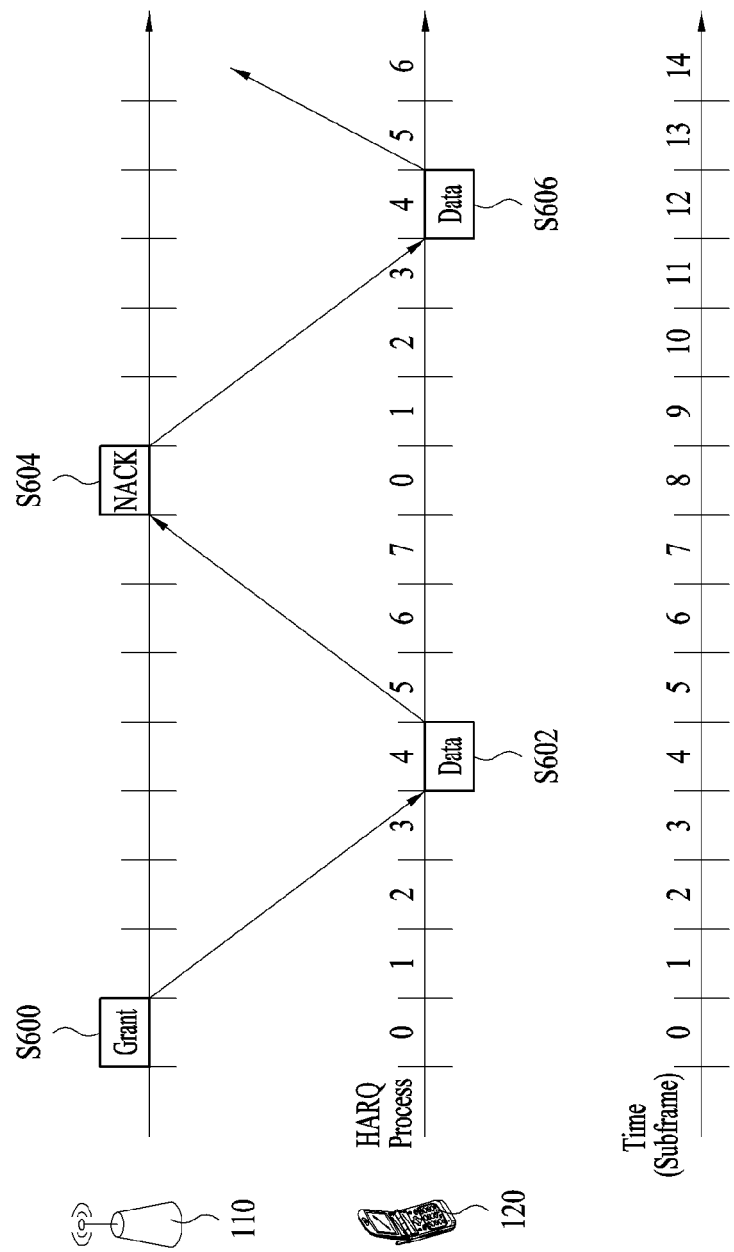
FIG. 6 illustrates an uplink hybrid automatic repeat request (UL HARQ) operation.

FIG. 6 illustrates UL HARQ operation in an LTE(-A) system. LTE(-A) uses synchronous non-adaptive HARQ as a UL HARQ scheme. When 8-channel HARQ is used, HARQ process numbers 0 to 7 are given. A HARQ process is performed per TTI (e.g. subframe). Referring to FIG. 6, a BS 110 transmits a UL grant to a UE 120 through a PDCCH (S600). The UE 120 transmits uplink data to the BS 110 using an RB and MCS indicated by the UL grant 4 subframes (e.g. subframe #4) from when the UL grant is received (e.g. subframe #0) (S602). The BS 110 decodes the uplink data received from the UE 120 and generates ACK/NACK. When the BS 110 has not successfully decoded the uplink data, the BS 110 transmits NACK to the UE 120 (S604). The UE 120 retransmits the uplink data 4 subframes from when NACK is received (S606). Initial transmission and retransmission of the uplink data are performed by the same HARQ process (e.g. HARQ process #4). ACK/NACK information can be transmitted on a PHICH.

Semi-persistent scheduling (SPS) will now be described. Normal unicast data dynamically allocates a resource per subframe according to scheduling. On the other hand, SPS reserves resources for traffic, which is periodically generated having a middle/low data rate, such as VoIP (voice over Internet protocol) or streaming. SPS can reduce scheduling overhead and stably allocate resources by reserving resources for specific traffic.

In the case of DL/UL SPS in LTE(-A), information (referred to as SPS configuration information hereinafter, simply SPS configuration) about a subframe in which SPS transmission (Tx)/reception (Rx) needs to be performed is provided through RRC (Radio resource control) signaling and activation, reactivation and release of SPS is performed through a PDCCH. Subframe information for SPS includes a subframe interval and subframe offset. The PDCCH for SPS activation/reactivation/release is referred to as an SPS PDCCH for convenience. The SPS PDCCH carries RB allocation information for SPS Tx/Rx and MCS information. In the case of SPS PDCCH, CRC (cyclic redundancy check) is masked with an SPS C-RNTI (cell radio network temporary identifier). Accordingly, a UE does not immediately perform SPS Tx/Rx even when information about a subframe related to SPS is allocated to the UE through RRC signaling. Upon reception of an SPS PDCCH indicating SPS activation (or reactivation), the UE performs SPS Tx (e.g. transmission of PUSCH (referred to as SPS-PUSCH hereinafter)) or SPS Rx (e.g. reception of PDSCH (referred to as SPS-PDSCH hereinafter)) in the subframe allocated through RRC signaling. SPS Tx/Rx is performed in a subframe using RB allocation information and MCS information included in the SPS PDCCH. Upon reception of a PDCCH indicating SPS release, the UE stops SPS Tx/Rx. When an SPS PDCCH indicating activation (or reactivation) is received, stopped SPS Tx/Rx is resumed in a subframe allocated through RRC signaling using RB allocation information and MCS information designated by the SPS PDCCH. SPS transmission timing, RB allocation information, MCS information, etc. with respect to activated SPS can be changed according to a "reactivation" command sent over a PDCCH. In addition, resources, MCS, etc. to be used for PDSCH/PUSCH retransmission in activated SPS can be changed through a PDCCH ("reallocation").

Figure 7:
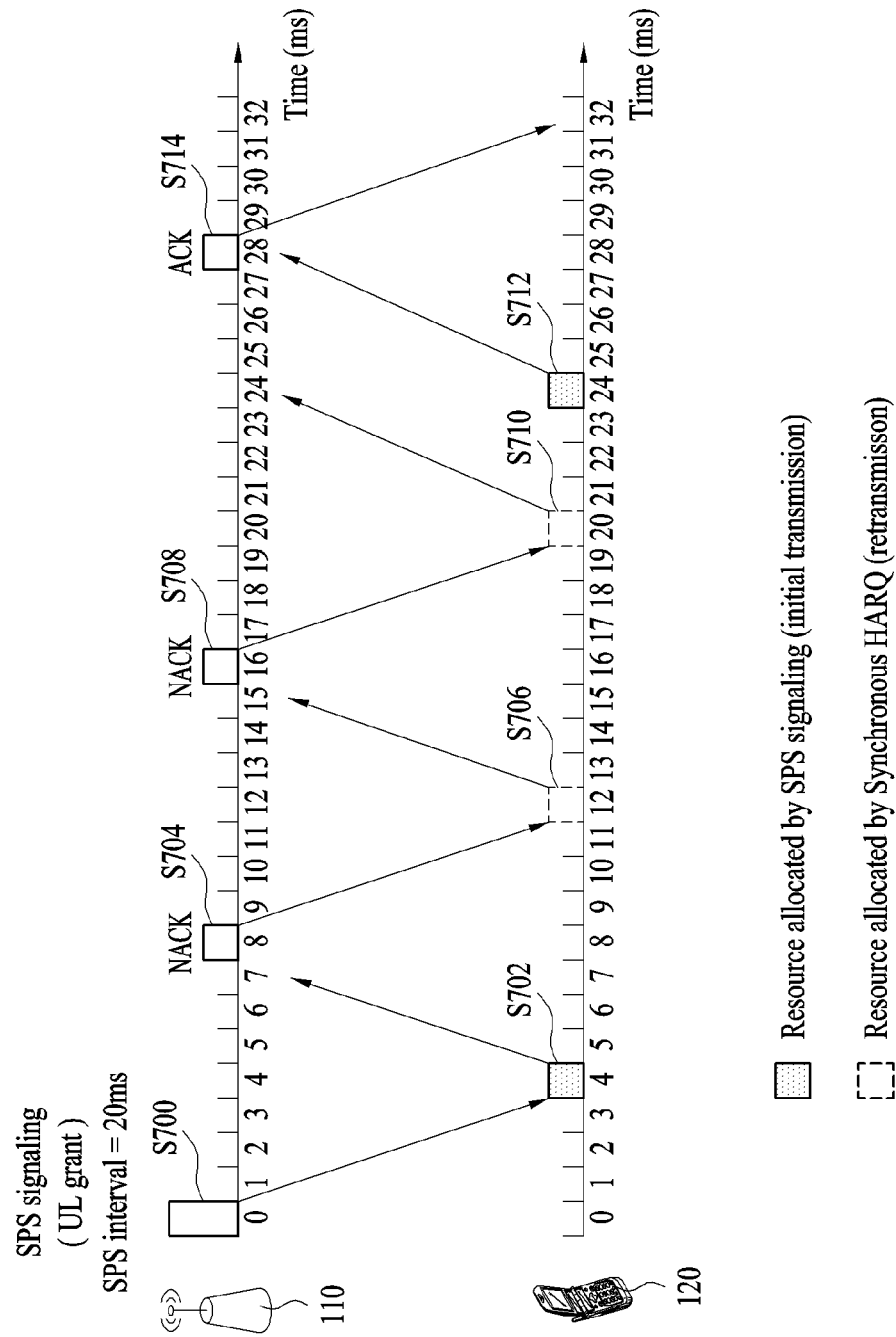
FIG. 7 illustrates an operation method of uplink semi-persistent scheduling (SPS).

FIG. 7 illustrates an uplink SPS operation. It is assumed that an SPS resource allocation interval is set to 20 ms through higher layer (e.g. RRC) signaling.

Referring to FIG. 7, the BS 110 transmits an SPS PDCCH indicating SPS activation to the UE 120 (S700). The SPS PDCCH includes UL grant information. In this case, the UE 120 is assigned a specific RB, MCS, etc. designated by the SPS PDCCH for uplink transmission at an interval of 20 ms from when a UL grant message is received through SPS signaling. Accordingly, the UE 120 can perform uplink transmission using the RB and MCS indicated by the SPS PDCCH at an interval of 20 ms (S702 and S712). When UL synchronous HARQ is used, resources for retransmission are reserved at an interval of 8 ms after initial transmission (S706 and S710). Specifically, the UE 120 performs retransmission through resources reserved for HARQ retransmission (S706 and S710) upon reception of NACK for uplink data (S704 and S708). When the UE 120 has successfully performed initial transmission, that is, when the UE 120 has received ACK for the uplink data (S714), the resources reserved for HARQ retransmission can be used by other UEs.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

A data channel (e.g., PDSCH, PUSCH) and/or a control channel (e.g., M-PDCCH, PUCCH, PHICH) may be transmitted through multiple subframes in a repeated manner or using a TTI bundling technique to support coverage enhancement (CE). Additionally, the control/data channel may be transmitted for CE using a technique such as cross-subframe channel estimation or frequency (narrowband) hopping. Here, the cross-subframe channel estimation refers to a channel estimation method using reference signals in neighboring subframe(s) as well as a reference signal in a subframe in which the corresponding channel is present.

For example, an MTC UE may need CE of up to 15 dB. However, not all MTC UEs are in an environment requiring CE. In addition, not all MTC UEs require the same QoS. Devices such as, for example, sensors and meters may require high CE because they have low mobility and a small amount of data to transmit or receive and are very likely to be located in shaded areas. On the other hand, wearable devices such as a smart watch may have mobility and a relatively large amount of data to transmit or receive and are very likely to be located in non-shaded areas. Therefore, not all MTC UEs need a high level of CE, and the required capability may depend on the type of the MTC UE.

Figure 8:
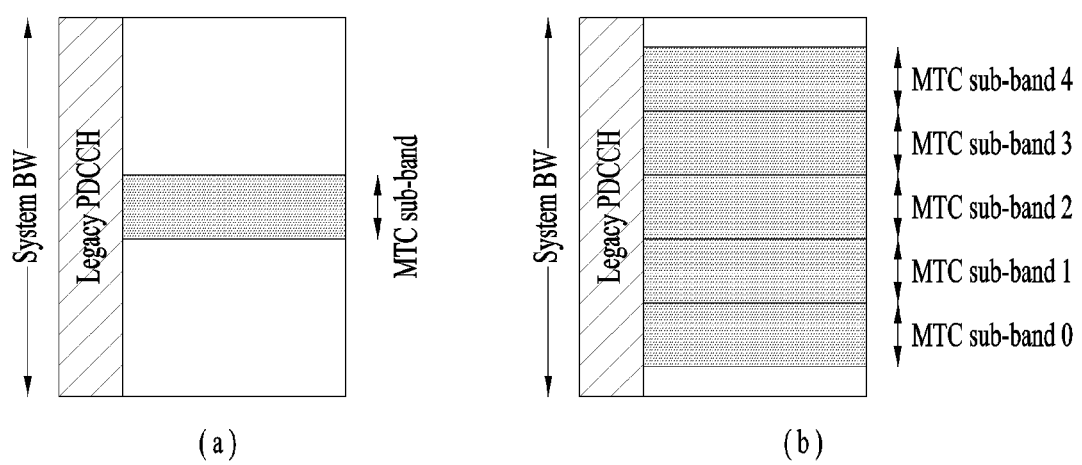
FIG. 8 shows an example of a signal band for machine-type communication (MTC).

FIG. 8 shows an example of a signal band for MTC.

To lower the cost of an MTC UE, the MTC UE may operate in a reduced UE downlink and uplink bandwidth of, for example, 1.4 MHz, regardless of the operating system bandwidth of the cell. In this case, a sub-band (i.e., narrowband) in which the MTC UE operates may always be at the center of the cell (e.g., six central PRBs) as shown in FIG. 8(*a*). Alternatively, as shown in FIG. 8(*b*), in order to multiplex MTC UEs in a subframe, multiple sub-bands for MTC may be arranged in one subframe such that the UEs use different sub-bands or that the UEs use the same sub-band which is different from the sub-band consisting of the six central PRBs.

In this case, an MTC UE may not properly receive the legacy PDCCH transmitted through the entire system band. In addition, due to the issue of multiplexing with a PDCCH transmitted to other UEs, transmitting the PDCCH for the MTC UE in the OFDM symbol region where the legacy PDCCH is transmitted may not be preferable. In order to address this issue, it is necessary to introduce a control channel to be transmitted in a sub-band in which MTC operates, in consideration of the MTC UE. As a downlink control channel for such low-complexity MTC UEs, the legacy EPDCCH may be used. Alternatively, an M-PDCCH for the MTC UE, which is a control channel corresponding to a variation of the legacy PDCCH/EPDCCH, may be introduced. Hereinafter, a physical downlink control channel of the legacy EPDCCH or the M-PDCCH for such low-complexity MTC UEs or normal-complexity MTC UEs is referred to as M-PDCCH. In the following description, MTC-EPDCCH has the same meaning as the M-PDCCH.

Legacy LTE 3GPP Rel-13 provides two classes of low cost Internet of Things (IoT) devices with enhanced coverage and a longer battery life: enhanced MTC (eMTC)

devices and narrowband IoT (NB-IoT) devices have 6 PRBs and 1 PRB as UE bandwidths, respectively (1 PRB=180 kHz). Introduction of further enhanced MTC (FeMTC), which is a further enhancement of the legacy LTE Rel-13 eMTC, is being considered as follows.

One of the goals of the FeMTC is to improve information technology.

Supporting a higher data rate
Larger transport block size (TBS): up to 2000 bits
Larger HARQ process number
Improving mobility
Improving SPS Hereinafter, things to be considered when an MTC (e.g., FeMTC) UE supports a service (e.g., VoLTE) using SPS are proposed.

In the embodiments of the present invention described below, the expression "assume" may mean that a subject to transmit a channel transmits the channel in conformity with a corresponding "assumption." It may also mean that a subject to receive the channel may receive or decode the channel in conformity with the "assumption", on the premise that the channel has been transmitted in conformity with the "assumption."

A. Transport Block Mapping within a Multi-Subframe

For the SPS, through which data is periodically transmitted, the amount of data that can be transmitted at a time should be increased in order to support a higher code rate while transmitting SPS data (e.g., a TB) with the same periodicity. For the eMTC UE, however, the transmission/reception band is limited to 6 PRBs, and thus there is a limitation on the size of data (e.g., transport block (TB)) that can be transmitted at a time. In order to transmit more data at a time, the amount of transmission resources on which the TB is transmitted may be increased. For eMTC, there is a limitation on transmission resources in the frequency domain, and therefore transmission resources may be increased in the time domain. Accordingly, in the present invention, it is proposed that one SPS datum be mapped to (over) multiple subframes in transmitting/receiving SPS data (e.g., TB) of an MTC (e.g., FeMTC) UE.

In the following description, it is assumed that a TB is transmitted on a PDSCH (hereinafter referred to as SPS PDSCH) in the downlink SPS and is transmitted on a PUSCH (hereinafter referred to as SPS PUSCH) in the uplink SPS. However, the PDSCH/PUSCH is merely an example of data transmission channels/shared channels. The PDSCH/PUSCH may be replaced with another physical channel that is used for data transmission. While the following description is mainly given of a case where the SPS PDSCH/PUSCH carries a single TB, the SPS PDSCH/PUSCH may carry multiple TBs depending on a transmission mode of a cell in which the SPS transmission is performed. The PDSCH/PUSCH refers to the PDSCH or the PUSCH.

Figure 9:
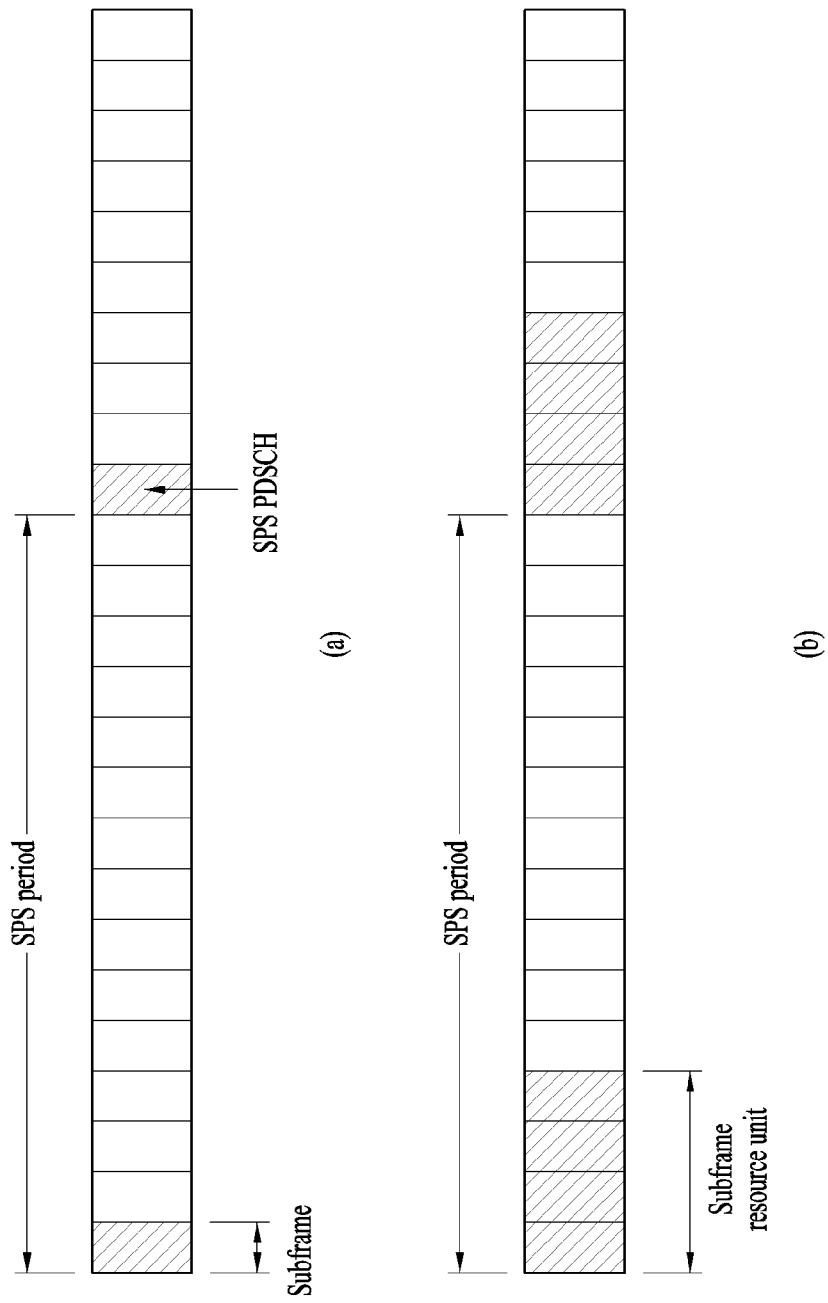
FIG. 9 illustrates a time resource in which SPS data is transmitted.

FIG. 9 illustrates a time resource on which SPS data is transmitted. Referring to FIG. 9(a), one TB is mapped to one subframe in every SPS period. In the present invention, as shown in FIG. 9(b), one TB may be mapped to (over) multiple subframes in every SPS period. Thereby, a TB having a larger size than in conventional SPS transmission may be transmitted. For simplicity, a set of subframes to which one TB is mapped is called a subframe resource unit (SRU) or a resource unit (RU). For example, one SRU consists of one subframe in FIG. 9(a), while one SRU consists of four consecutive subframes in FIG. 9(b).

Figure 10:
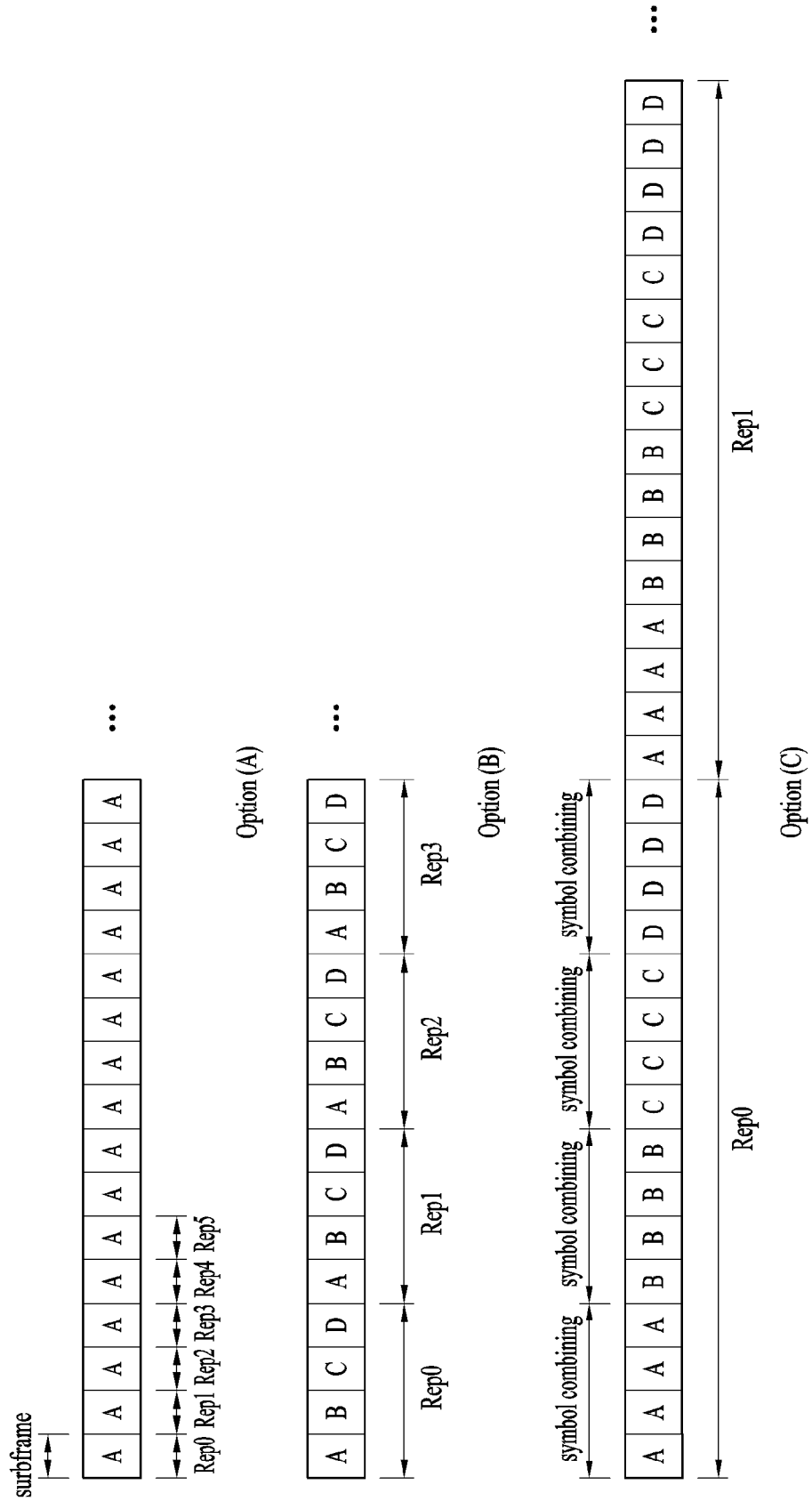
FIGS. 10 and 11 illustrate SPS PDSCH/PUSCH transmission when data is repeatedly transmitted in the time domain for coverage enhancement according to the present invention.

FIG. 10 illustrates SPS PDSCH/PUSCH transmission when data is repeatedly transmitted in the time domain for coverage enhancement according to the present invention.

Referring to FIG. 10(a), an SPS PDSCH/PUSCH may be mapped into one subframe. The SPS PDSCH/PUSCH may be repeatedly transmitted within a multi-subframe (i.e., an SRU). In this case, the same content is transmitted on the SPS PDSCH/PUSCH mapped to the respective subframes in the SRU.

On the other hand, one SPS PDSCH/PUSCH may be mapped to (over) resources in the multi-subframe (i.e., the SRU). That is, one TB may be mapped over several subframes within the multi-subframe. Referring to FIG. 10(b), one SPS PDSCH/PUSCH may be mapped to an SRU consisting of four subframes, and the SRU for transmission may be repeated multiple times in the time domain.

When the same SPS content is transmitted at the same RE position in consecutive subframes and a receiving terminal performs symbol-level (or RE-level) combining for the SPS data, the UE buffer size and complexity may be reduced and performance may be improved. To this end, one SPS PDSCH/PUSCH may be mapped to resources within the multi-subframe (i.e., the SRU) consisting of X non-consecutive subframes, and each of the X subframes constituting the SRU may be repeated for Y consecutive subframes. The X*Y subframes through which one SPS PDSCH/PUSCH is transmitted may constitute a subframe bundle. The subframe bundle may be repeated for the transmission. Referring to FIG. 10(c), when X (=4) subframes are subframes A, B, C, and D, each of the subframes may be repeated for Y (=4) consecutive subframes. Accordingly, one SPS PDSCH/PUSCH may be transmitted through X*Y (=16) subframes in the pattern of subframes A, A, A, A, B, B, B, B, C, C, C, C, D, D, D, and D. Here, the X*Y (=16) subframes constitute a subframe bundle, and the subframe bundle may be repeated for the transmission.

The data is stored in a cyclic buffer after being encoded, and data blocks (i.e., some of the encoded bits) sequentially read out from the cyclic buffer are used for data transmission. The starting point at which the data blocks are read from the cyclic buffer is specified by a redundancy version (RV). RV values specifying different starting points are defined for the HARQ operation. For example, RV ranging from 0 to 3 may be defined. As the RV value increases, it may indicate a starting point shifted further backward in the cyclic buffer. The cyclic buffer stores systematic bits and parity bits in this order. In initial transmission, 0 is usually selected as the RV to transmit as many systematic bits as possible. Depending on the context, the RV may refer to a data block read from the cyclic buffer.

In the present invention, the RV value may be changed in every repetition or every multiple repetitions in transmitting SPS data. In this case, the RV for A, B, C, and D transmitted after one or more repetitions may be changed. When the data about the RV i are $A_i$, $B_i$, $C_i$, and $D_i$, A, B, C and D A, B, C, D may be replaced by $A_i$, $B_i$, $C_i$, and $D_i$ in FIGS. 10(b) and 10(c). Here, the value of i may be changed in every repetition or every plural repetitions. In the case of FIG. 10, the value of i may not be changed during X repetitions performed for symbol-level combining. When a subframe bundle consisting of X*Y subframes is further repeatedly transmitted, the value of i may be changed in every repetition or every multiple repetitions.

Figure 11:
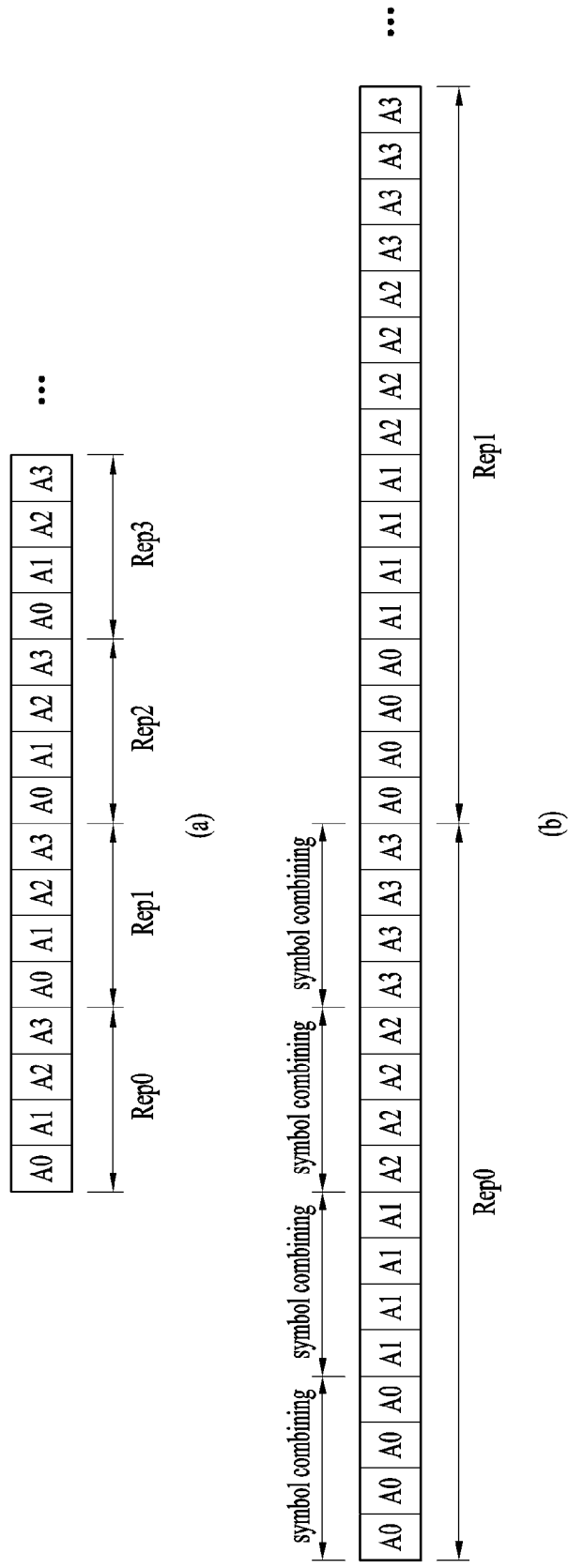

When one SPS PDSCH/PUSCH is mapped to a resource in a multi-subframe (i.e., an SRU), data about different RV values may be mapped to the respective subframes in the SRU. That is, when one TB is mapped to a resource in the multi-subframe, the RV value may be changed in every subframe. In this case, when data about, for example, four RV values are transmitted as shown in FIG. 11(a), mapping of the SPS PDSCH/PUSCH to RVs 0, 1, 2, and 3 may be applied in the respective subframes in the SRU. The SRU may be repeatedly transmitted multiple times in the time domain. In this case, the order of mapping of the RV values may be predetermined or be configured by the eNB using SIB, RRC, DCI, or the like. For simplicity, data transmission to which RV i is applied is referred to as Ai.

Alternatively, considering symbol-level combining, one SPS PDSCH/PUSCH may be mapped to a multi-subframe (i.e., an SRU) resource consisting of X non-consecutive subframes with the RV value being changed, and each of the X subframes may be repeated for Y consecutive subframes. In this case, the X*Y subframes (hereinafter referred to as a subframe bundle) may be further repeated for the transmission. Here, when the X (=4) subframes to which one SPS PDSCH/PUSCH is mapped are subframes A0, A1, A2, and A3 as shown in FIG. 11(b), each of the subframes may be repeated for Y (=4) consecutive subframes. Thus, one SPS datum (or SPS PDSCH/PUSCH) may be transmitted through X*Y (=16) subframes arranged in the pattern of [A0, A0, A0, A0, A1, A1, A1, A1, A2, A2, A2, A2, A3, A3, A3, A3]. The X*Y (=16) subframes may be further repeated for the transmission.

Next, a method for early termination performed when one TB is transmitted through multiple subframes will be described. When one TB is mapped to a multi-subframe (hereinafter, multi-SF TB mapping), the following cases may be considered.

(1) The total number of REs of the multi-subframe is smaller than the number of modulation symbols of the TB on the assumption of a configured modulation scheme. In this case, the minimum number of subframes necessary for mapping of systematic bits after the TB is encoded is larger than the number of scheduled subframes. That is, the number of scheduled subframes is smaller than the minimum number of necessary subframes (or REs).

(2) The total number of REs of the multi-subframe is equal to the number of modulation symbols of the TB on the assumption of the configured modulation scheme. In this case, the minimum number of subframes necessary for mapping of the systematic bits after the TB is encoded is equal to the number of scheduled subframes. That is, the number of scheduled subframes is the minimum number of necessary subframes.

(3) The total number of REs of the multi-subframe is larger than the number of modulation symbols of the TB on the assumption of the configured modulation scheme. In this case, the number of scheduled subframes is larger than the minimum number of subframes necessary for mapping of the systematic bits after the TB is encoded. That is, the number of scheduled subframes is larger than the minimum number of necessary subframes.

For simplicity, suppose that the number of subframes (or the number of resource units) scheduled/configured to be mapped to one TB is n, and the minimum number of subframes necessary for mapping of the systematic bits is m. Here, m may be the number of resource units or subframes to which the minimum unit of self-decodable information is mapped.

For m and n, mapping may be performed as follows. r' is the number of repetitions configured through DCI or the like. In case (1), it is assumed that r=r'/m. In cases (2) and (3), r=r'. Here, r denotes the number of actual repetitions in the SPS PDSCH/PUSCH transmission.

Method for Sending a Self-Decodable Unit First

A transmitting terminal (e.g., eNB/UE) repeats a unit of one-time transmission of A0, A1, . . . , Am−1 r times. Thereafter, the terminal transmits Am, . . . , An−1 and repeats the same r times, where n>m.

In this case, upon receiving A0, . . . , Am−1, a receiving terminal (e.g., UE/eNB) may attempt to decode the TB because it has received the minimum-size self-decodable data. Accordingly, when Am−1 is received in subframe n, HARQ-ACK (ACK, NACK, DTX) for the TB may be transmitted at least after subframe n+K. Accordingly, the receiving terminal does not need to decode the TB before subframe n. Here, K denotes the minimum processing time required for data decoding and generation of HARQ-ACK (e.g., K=4).

Transmission Scheme for Symbol-Level Combining that Allows a Self-Decodable Unit to be Sent First The transmitting terminal (e.g., eNB/UE) may transmit A0, . . . , A0 (r times), A1, . . . , A1 (r times), . . . , Am−1, . . . , Am−1 (r times), and transmit Am, . . . , Am (r times), . . . , An−1, . . . , An−1 (r times) (if n>m).

In this case, upon receiving all of A0, . . . , Am−2 ((m−1)*r subframes) and at least one Am−1, the receiving terminal (e.g., UE/eNB) may attempt to decode the TB because it has received the minimum-size self-decodable data. Accordingly, if the first Am−1 is received in subframe n, the HARQ-ACK for the TB may be transmitted at least after subframe n+K. Accordingly, the receiving terminal does not need to decode the TB before subframe n.

Method for Transmitting the Minimum Unit for Symbol-Level Combining First in Sending a Self-Decodable Unit Suppose that the minimum number of repetitions for symbol-level combining is k (k<r). In this case, the transmitting terminal (e.g., eNB/UE) may repeat the unit of one-time transmission of A0, A1, . . . , Am−1 k times. Then, the transmitting terminal may transmit Am, . . . , An−1 and repeat the same k times, where n>m. This transmission may be repeated r/k times. In this case, upon receiving A0, . . . , Am−1, the receiving terminal (e.g., the UE/eNB) may attempt to decode the TB because it has received the minimum-size self-decodable data. Accordingly, if Am−1 is received in subframe n, HARQ-ACK for the TB may be transmitted at least after subframe n+K. Accordingly, the receiving terminal does not need to decode the TB before subframe n.

Alternatively, instead of transmitting A0, A1, . . . , Am−1, the transmitting terminal (e.g., eNB/UE) may transmit A0, . . . , A0 (by repeating A0 k times), A1, . . . , A1 (by repeating A1 k times), . . . , Am−1, . . . , Am−1 (by repeating Am−1 k times), and then transmit Am, . . . , Am (by repeating Am k times), . . . An−1, . . . , An−1 (by repeating An−1 k times) if n>m. This transmission may be repeated r/k times. In this case, upon receiving all of A0, . . . , Am−2 ((m−1)*r subframes) and at least one Am−1, the receiving terminal (e.g., UE/eNB) may attempt to decode the TB because it has received the minimum-size self-decodable data. Accordingly, if the first Am−1 is received in subframe n, the HARQ-ACK for the TB may be transmitted at least after subframe n+K. Accordingly, the receiving terminal does not need to decode the TB before subframe n.

Hereinafter, methods of configuring an SRU size for the UE to support SPS PDSCH/PUSCH transmission are proposed below.

Method 1. In the case where the SRU size is signaled on an M-PDCCH that is scrambled with an SPS RNTI (e.g., SPS C-RNTI) and transmitted, a field for explicitly configuring/indicating the SRU size may be added to the DCI.

Method 2. When SPS configuration is transmitted to the UE through RRC signaling, configuration information about the SRU size may be added to the SPS configuration.

Method 3. In the case where the SRU size is signaled on an M-PDCCH that is scrambled with an SPS RNTI and transmitted, the SRU size may be determined according to a modulation coding scheme (MCS) index and/or a transport block size (TBS) index. That is, the SRU size may be defined in association with the MCS index and/or the TBS index, and the UE may identify the SRU size based on the MCS index and/or the TBS index. More specifically, multi-SF TB mapping may be applied only for a large TB size (e.g., a size that is larger than or equal to/exceeds 1800 bits or 2000 bits or a size that is larger than or equal to/exceeds the maximum TB size supported by QPSK modulation in transmission of a normal PDSCH/PUSCH rather than the SPS PDSCH/PUSCH), or the SRU size may be set to be greater than 1. Alternatively, the multi-SF TB mapping may be applied only for a specific TB size (e.g., 2000 bits) or the SRU size may be set to be greater than 1. When the multi-SF TB mapping is applied, the UE may assume the allocated PRB size to be 6 PRBs (regardless of the RB allocation information in the MPDCCH that indicate SPS activation).

Method 4. For an M-PDCCH that is scrambled with an SPS-RNTI and transmitted, the SRU size may be indicated through a PRB allocation field.

For example, additional bit(s) may be added to the PRB allocation field. The additional bit(s) may be used to indicate whether to perform multi-SF TB mapping and/or to indicate the SRU size.

Alternatively, some values of the PRB allocation field may indicate whether to perform multi-SF TB mapping and/or the size of the SRU through the additional bit(s). Thus, when each value of the PRB allocation field is known, the UE may identify whether to perform the multi-SF TB mapping and/or the SRU size as well as the PRB resource position/size. Here, the multi-SF TB mapping may be configured to be performed only when the PRB resource size is 6 PRBs. That is, the SRU size may be set to be greater than 1 only when the PRB resource size is 6 PRBs. On the other hand, when the PRB resource size is smaller than 6 PRBs, the TB may be mapped to one subframe (single-SF TB mapping) and the SRU size may be set to 1. In another example, the UE may perform multi-SF TB mapping only when the number of allocated data transmission PRBs is greater than 6. For example, when the size of data transmission PRBs N_PRB is greater than 6, the PRB size may be set to a multiple of 6, data may be transmitted through 6 RPBs in one subframe, and the SRU size may be given as N_PRB/6. On the other hand, when the number of data transmission PRBs is less than or equal to 6, the TB may be mapped to a single subframe (single-SF TB mapping), and the SRU size may be set to 1.

Multi-subframe scheduling may be introduced in order to increase transmission throughput within a given SPS period. That is, multiple TBs may be transmitted using a multi-subframe within the SPS period (hereinafter, the operation is referred to as multi-TB scheduling). When the number of repetitions is 1, N TBs may be transmitted through N subframes, with each TB allocated to one subframe.

To this end, it is necessary to configure, for the UE, the number of TBs transmitted at a time n in transmitting an SPS PDSCH/PUSCH. The method of configuring the number of TBs for the UE may be applied by replacing multi-SF TB mapping with multi-TB scheduling and the SRU size with the number of TBs subjected to multi-TB scheduling in the method of configuring the SRU size for the UE.

In a case where multi-TB scheduling is performed in transmitting the SPS PDSCH/PUSCH, only some TBs that have failed to be decoded may be retransmitted in retransmitting the SPS PDSCH/PUSCH.

Although the present invention has been described focusing on transmission of an SPS PDSCH/PUSCH and transmission of an M-PDCCH for scheduling the same, the present invention may also be applied to transmission of a normal PDSCH/PUSCH that is dynamically scheduled.

B. SPS Transmission Using Multi-Narrowband

In legacy 3GPP Rel-13 eMTC, up to 6 PRBs may be allocated in a single narrowband as resources for a PDSCH/PUSCH and the maximum TBS is limited to 1736 bits. In order to support a high data rate, the number of PRBs allocated to the PDSCH/PUSCH may be increased. To this end, the following method may be used.

Narrowband Extension

To support a high data rate, a narrowband may be configured with six or more consecutive PRBs to extend the narrowband size. The present method does not require additional radio frequency (RF) components, but may increase the UE cost/complexity to support a larger Fast Fourier Transform (FFT) size and baseband operation in a wider band. The narrowband size may be extended up to 10 PRBs (120 subcarriers) without increasing the FFT size.

Narrowband Aggregation

To support a high data rate, multiple narrowbands may be configured for the MTC UE. Accordingly, the MTC UE may simultaneously transmit and receive data through the plurality of narrowbands. Each narrowband may be seen as a single serving cell (or single carrier) in carrier aggregation. This method may be advantageous in terms of flexibility of use of resources. However, the method requires as many RF components as the number of narrowbands, and may increase the UE cost/complexity to support parallel processing.

When narrowband aggregation is configured, the SPS data may transmitted (simultaneously) through multiple narrowbands to increase the code rate or transmitted through a specific narrowband among the multiple narrowbands.

Method for a Plurality of SPS Schedulings

As a first method to increase throughput performance for SPS transmission, multiple SPS data may be scheduled in different narrowbands. For example, SPS activation/release may be configured for each of the narrowbands such that two or more SPS transmissions may operate independently for each UE. To this end, the SPS configuration and SPS activation/release information may be transmitted as follows.

There may be SPS configuration information for each narrowband. In this case, an SPS configuration may be present in every narrowband in which the UE performs an reception operation or be present only in specific narrowband(s) in which the UE performs an reception operation. For example, there may be multiple SPS configurations, and each of the SPS configurations may include narrowband index information to which the SPS configuration is applied. Alternatively, an SPS configuration applied to each narrowband may be transmitted on the MPDCCH and/or PDSCH in the corresponding narrowband. Alternatively, there may be multiple SPS configurations, but each of the SPS configurations may not include information about a narrowband to which the SPS configuration is applied. In this case, each SPS configuration may be distinguished by a separate SPS index or SPS-RNTI. Here, the information about the narrowbands in which the SPS transmission is performed may be configured through an SPS activation message (e.g., MPDCCH (DCI) indicating SPS activation).

In this case, activation/release for each SPS configuration may be performed independently. In order to distinguish between activations/releases for multiple SPS configurations, an SPS configuration index or a narrowband index may be included in the DCI indicating the SPS activation/release. Alternatively, each SPS configuration may include an independent SPS-RNTI such that activations/releases for multiple SPS configurations may be distinguished through the SPS-RNTI. Alternatively, in order to perform SPS activation/release for a specific narrowband, an SPS activation/release message (e.g., MPDCCH (DCI) indicating SPS activation/release) may be transmitted in the narrowband.

There may be only one SPS configuration, and the SPS configuration may be applied to any SPS scheduling. Thus, multiple SPS transmissions may be activated/released using the same SPS configuration. In this case, in order to distinguish between different SPS schedulings, index information about SPS scheduling may be included in the DCI indicating SPS activation/release. Alternatively, the SPS narrowband index information may be included in the DCI indicating the SPS activation/release, and the SPSs transmitted through different narrowbands may be regarded as SPS schedulings distinguished from each other. Alternatively, activations/releases for multiple SPS schedulings may be distinguished from each other using different SPS-RNTIs for the respective SPS schedulings. In this case, multiple SPS-RNTIs to be used by the UE may be configured through the SPS configuration. Alternatively, activations/releases for multiple SPS schedulings may be distinguished from each other by transmitting an SPS activation/release message (e.g., MPDCCH (DCI) indicating SPS activation/release) through different narrowbands.

Switching Between SPS Transmission Narrowbands

When there are multiple narrowbands in a cell, the position of a narrowband in which the SPS PDSCH/PUSCH transmission is performed may be changed depending on the time when the SPS PDSCH/PUSCH is transmitted, in order to obtain frequency diversity and deconcentrate data load. In addition, when the number of repetitions/the number of transmission subframes of the SPS PDSCH/PUSCH is larger than the SPS period, the position of a narrowband for SPS PDSCH/PUSCH transmission may be changed according to the transmission time of the SPS PDSCH/PUSCH, in order to normally perform the SPS PDSCH/PUSCH transmission in every period. For example, a narrowband in which the SPS PDSCH/PUSCH is expected to be transmitted in each SPS period may be determined by a specific equation. For example, the SPS transmission narrowband may be determined by a subframe index, a super frame number (SFN), an SPS period, a UE ID, and the like. In addition, the SPS PDSCH/PUSCH transmission narrowband may be changed according to the HARQ process ID of the SPS PDSCH/PUSCH. Accordingly, different HARQ process IDs may be given for respective narrowbands (e.g., carriers). In conventional cases, the HARQ process IDs are distinguished based on the data transmission time in the time domain. In the present invention, on the other hand, the HARQ process IDs are distinguished based on a frequency position (e.g., frequency index, narrowband index) at which data transmission is performed in the frequency domain. In more general terms, the HARQ process IDs may be distinguished by frequency/carrier regardless of SPS transmission even when transmission of normal data (e.g., PDSCH/PUSCH) is performed. That is, for data (e.g., PDSCH/PUSCH) scheduled by a control channel (e.g., PDCCH), the HARQ process ID may be determined based on the frequency position (e.g., frequency index, narrowband index) at which the data is transmitted.

When the number of repetitions/the number of transmission subframes of the SPS PDSCH/PUSCH is smaller than or equal to the SPS period, the narrowband for SPS PDSCH/PUSCH transmission may be maintained at the same position in every SPS period because the SPS PDSCH/PUSCH transmission can be normally performed in every SPS period. In consideration of retransmission of the SPS PDSCH/PUSCH, whether to switch between narrowband positions in transmitting the SPS PDSCH/PUSCH may be determined based on whether the number of repetitions/the number of transmission subframes of the SPS PDSCH/PUSCH is larger than [SPS period-X]. Here, X is a multiple of the HARQ period. For example, X may be 8 subframes.

Figure 12:
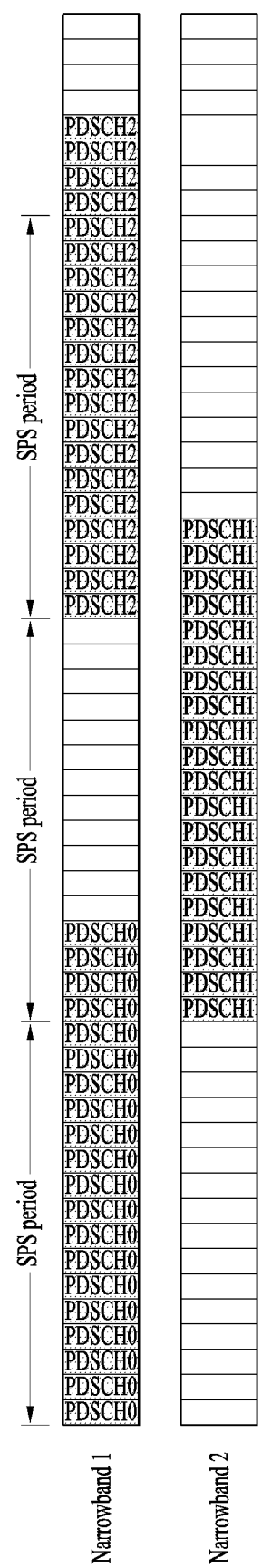
FIG. 12 illustrates a method of transmitting an SPS PDSCH/PUSCH in a case where an SPS PDSCH/PUSCH having the number of repetitions larger than the SPS period according to the present invention.

FIG. 12 illustrates a method of transmitting an SPS PDSCH/PUSCH in a case where an SPS PDSCH/PUSCH having the number of repetitions larger than the SPS period according to the present invention.

Referring to FIG. 12, the SPS period is 16 subframes and the number of SPS repetitions is 20. Therefore, when SPS transmission is performed in the same narrowband, transmission/reception of the next SPS PDSCH/PUSCH begins before transmission/reception of an SPS PDSCH/PUSCH is terminated. Accordingly, collision may occur between the previous SPS transmission and the current SPS transmission in four subframes in every SPS period. However, as shown in the figure, when a narrowband in which SPS transmission is performed is switched from narrowband 1 to narrowband 2 to narrowband 1 in each SPS period, a UE capable of receiving data in multiple narrowbands may receive every SPS PDSCH/PUSCH without any problem. Although not shown in the figure, when the number of repetitions of the SPS PDSCH/PUSCH is smaller than the SPS period, SPS transmission may be performed only in a single narrowband (e.g., narrowband 1). The figure illustrates a case of switching between narrowbands through which an SPS PDSCH/PUSCH is transmitted when the number of repetitions of the SPS PDSCH/PUSCH is larger than the SPS period. The illustrated case is merely an example. In order to guarantee an HARQ retransmission interval, narrowband switching may be performed when an SPS PDSCH/PUSCH having the number of repetitions larger than [SPS period-X] is transmitted. Here, X is a multiple of the HARQ period. For example, X may be 8 subframes.

Distinction Between an SPS Transmission Narrowband and a Dynamically Scheduled Data Transmission Narrowband Even if the number of repetitions of the data is not larger than the SPS period, SPS transmissions may be interrupted due to SPS retransmission or transmission of other dynamically scheduled data.

This situation may be improved when a narrowband for SPS transmission is separated from a narrowband for transmission of dynamically scheduled data. For example, the UE may monitor the MPDCCH in a narrowband different from the SPS narrowband, and the MPDCCH may schedule data, avoiding the SPS narrowband.

Considering the case where narrowband extension is employed instead of narrowband aggregation to increase the data rate, SPS may be transmitted using different PRB-set resources in an extended narrowband instead of multiple narrowbands. In this case, each narrowband in narrowband aggregation may be interpreted as/replaced with a PRB-set in the extended narrowband.

C. Issue of Collision Between SPS Transmissions within the Same Narrowband

In the case where the number of repetitions/the number of transmission subframes of the SPS PDSCH/PUSCH is configured to be larger than the SPS period, transmission/reception of the next SPS PDSCH/PUSCH begins before transmission/reception of the current SPS PDSCH/PUSCH is terminated. In this case, it is proposed that the UE operate as follows. For simplicity, it is assumed that the number of repetitions/the number of transmission subframes of the SPS PDSCH/PUSCH is received over an SPS activation message (e.g., MPDCCH (DCI) indicating SPS activation). The number of repetitions/the number of transmission subframes of SPS PDSCH/PUSCH may be configured over a higher layer signal (e.g., a MAC message).

When the UE receives DCI (an SPS activation message) in which the number of repetitions/the number of transmission subframes of the SPS PDSCH/PUSCH is configured to be larger than the SPS period, the UE may determine that the DCI (the SPS activation message) is invalid or has failed to be properly received. Thus, the UE may not perform an operation (e.g., demodulation, decoding, etc.) for receiving the data scheduled by the DCI.

When the UE receives DCI (an SPS activation message) in which the number of repetitions/the number of transmission subframes of the SPS PDSCH/PUSCH is configured to be larger than the SPS period, the UE may determine that the number of repetitions/the number of transmission subframes of the SPS PDSCH/PUSCH is equal to the SPS period.

When the UE receives DCI (an SPS activation message) in which the number of repetitions/the number of transmission subframes of the SPS PDSCH/PUSCH is configured to be larger than the SPS period, the UE may determine that the SPS period is equal to the number of repetitions/the number of transmission subframes of the SPS PDSCH/PUSCH. Alternatively, when k is the least integer that makes the SPS period*k greater than or equal to the number of repetitions/the number of transmission subframes of the SPS PDSCH/PUSCH, the UE may determine that the SPS period*k is an SPS period applied to transmission/reception of the SPS PDSCH/PUSCH.

Figure 13:
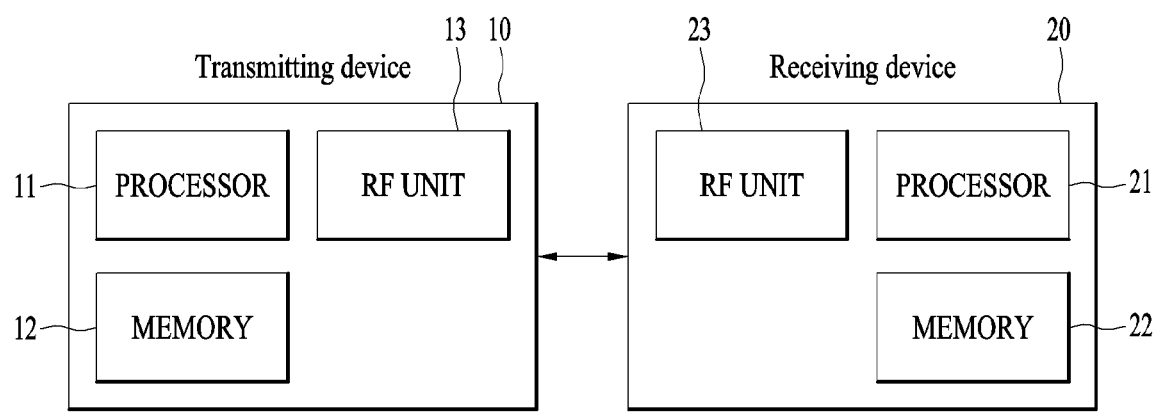
FIG. 13 is a block diagram illustrating elements of a transmitting device 10 and a receiving device 20 for implementing the present invention.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit a signal (e.g., sPDCCH/SPDSCH) according to any one of the methods proposed in the present invention. In addition, the UE processor may control the UE RF unit to receive a signal (e.g., sPDCCH/sPDSCH) according to any one of the methods proposed in the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for receiving data by a user equipment in a wireless communication system, the method comprising:
receiving information about a semi-persistent scheduling (SPS) transmission period;
checking information about the number of SPS repetitions; and
receiving new SPS data repeatedly transmitted in every SPS transmission period based on the SPS transmission period and the number of SPS repetitions,
wherein, when the SPS transmission period is longer than the number of SPS repetitions, a frequency band in which the SPS data is received is maintained to be the same in every SPS transmission period, and
wherein, when the SPS transmission period is shorter than the number of SPS repetitions, the frequency band in which the SPS data is received is switched in every SPS transmission period.

2. The method according to claim 1, wherein, when the SPS transmission period is shorter than the number of SPS repetitions, previous SPS data and current SPS data are simultaneously received in different frequency bands at a time when each SPS transmission period starts.

3. The method according to claim 1, wherein, when the SPS transmission period is shorter than the number of SPS repetitions, a hybrid ARQ (HARQ) process ID for the SPS data is determined based on the frequency band in which the SPS data is received.

4. The method according to claim 1, wherein the information about the SPS transmission period is received through radio resource control (RRC) signaling, and the information about the number of SPS repetitions is received on a physical downlink control channel (PDCCH) indicating SPS activation.

5. The method according to claim 1, wherein the SPS data comprises machine-type communication (MTC) data and a maximum size of each of the frequency bands is 6 physical resource blocks (PRBs).

6. The method according to claim 5, further comprising:
receiving information indicating an SPS transmission band,
wherein, when the SPS transmission band is wider than 6 PRBs, the SPS transmission band is limited to a multiple of 6 PRBs, and the SPS data is repeatedly received on the 6 PRBs [the SPS transmission band/6 PRBs] times.

7. A user equipment (UE) used in a wireless communication system, the user equipment comprising:
a radio frequency (RF) unit; and
a processor configured to control the RF unit,
wherein the processor is configured to:
receive information about a semi-persistent scheduling (SPS) transmission period;
check information about the number of SPS repetitions; and
receive new SPS data repeatedly transmitted in every SPS transmission period based on the SPS transmission period and the number of SPS repetitions,
wherein, when the SPS transmission period is longer than the number of SPS repetitions, a frequency band in which the SPS data is received is maintained to be the same in every SPS transmission period, and
wherein, when the SPS transmission period is shorter than the number of SPS repetitions, the frequency band in which the SPS data is received is switched in every SPS transmission period.

8. The UE according to claim 7, wherein, when the SPS transmission period is shorter than the number of SPS repetitions, previous SPS data and current SPS data are simultaneously received in different frequency bands at a time when each SPS transmission period starts.

9. The UE according to claim 7, wherein, when the SPS transmission period is shorter than the number of SPS repetitions, a hybrid ARQ (HARQ) process ID for the SPS data is determined based on the frequency band in which the SPS data is received.

10. The UE according to claim 7, wherein the information about the SPS transmission period is received through radio resource control (RRC) signaling, and the information about the number of SPS repetitions is received on a physical downlink control channel (PDCCH) indicating SPS activation.

11. The UE according to claim 7, wherein the SPS data comprises machine-type communication (MTC) data and a maximum size of each of the frequency bands is 6 physical resource blocks (PRBs).

12. The UE according to claim 11, the processor is further configured to receive information indicating an SPS transmission band,
wherein, when the SPS transmission band is wider than 6 PRBs, the SPS transmission band is limited to a multiple of 6 PRBs, and the SPS data is repeatedly received on the 6 PRBs [the SPS transmission band/6 PRBs] times.

\* \* \* \* \*